A. P. BRYSON.
Churn.
No. 84,532.
Patented Dec. 1, 1868.
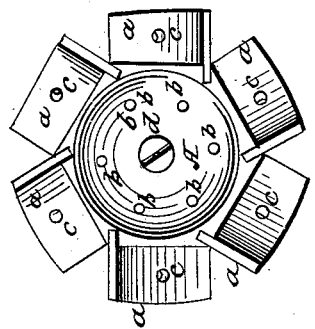
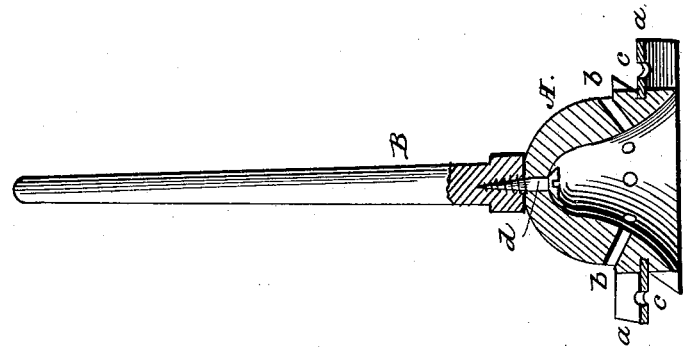
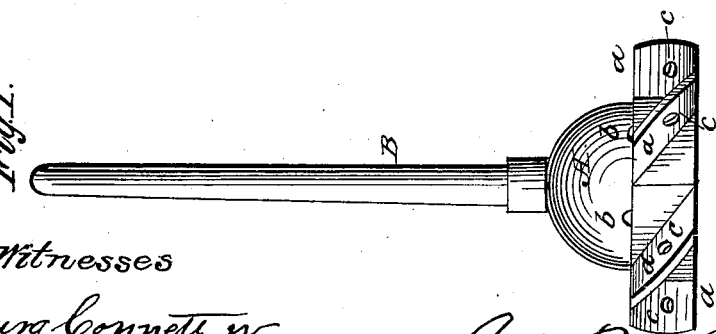

A. P. BRYSON, OF PROSPECT, PENNSYLVANIA.

Letters Patent No. 84,532, dated December 1, 1868.

IMPROVEMENT IN CHURNS.

The Schedule referred to in these Letters Patent and making part of the same.

*To all whom it may concern:*

Be it known that I, A. P. BRYSON, of Prospect, in the county of Butler, and State of Pennsylvania, have invented an Improved Churn-Dasher; and I do hereby declare that the following is a full and exact description thereof, reference being had to the accompanying drawings, making part of this specification—

Figure 1 being a side view of the dasher.

Figure 2, a central vertical section of the same.

Figure 3, a bottom view thereof.

Like letters designate corresponding parts in all the figures.

The form of the dasher A is concave on its under side, its external appearance being that shown in the figures, or any approximation thereto. It has, externally, near the base, a hexagonal or other polygonal form, to the faces of which are attached the wings $a\ a$. These wings are placed obliquely, in the manner substantially as represented, for the purpose of giving a rotary motion to the dasher on a vertical pivot, when the handle B receives a reciprocating motion in the ordinary way. This vertical pivot allows the dasher to turn freely in both directions.

Small apertures, $b\ b$, are formed obliquely through the shell of the dasher, from the concave chamber within, through which air and cream may pass, as the dasher moves up and down.

The wings may be perforated with openings $c\ c$, to assist in cutting the cream.

The oblique position of the wings gives the dasher a rotary reciprocating motion, when the handle is moved up and down, thus creating increased agitation in the cream.

As the dasher is lifted out of the cream at each upward stroke, its chamber fills with air, which is forcibly expelled through the apertures at the downward stroke, thus not only increasing the agitation, but allowing the air to commingle intimately with the cream.

What I claim as my invention, and desire to secure by Letters Patent, is—

The combination and arrangement of the oblique wings $a\ a$, and concave, perforated, revolving dasher, A, substantially as and for the purpose herein specified.

The above specification of my improved churn-dasher signed by me, this 18th day of August, 1868.

A. P. BRYSON.

Witnesses:
J. M. LEIGHNER,
J. W. BOOK.